(12) United States Patent  
Bobowick

(10) Patent No.: US 7,931,440 B2
(45) Date of Patent: Apr. 26, 2011

(54) VERTICAL AXIS WIND TURBINE

(76) Inventor: Donald Bobowick, Trumbull, CT (US)

( * ) Notice: Subject to any disclaimer, the term of this patent is extended or adjusted under 35 U.S.C. 154(b) by 59 days.

(21) Appl. No.: 12/467,286

(22) Filed: May 17, 2009

(65) Prior Publication Data

US 2010/0143133 A1 Jun. 10, 2010

Related U.S. Application Data

(60) Provisional application No. 61/200,745, filed on Dec. 4, 2008.

(51) Int. Cl.
F03D 7/06 (2006.01)

(52) U.S. Cl. ............... 416/132 B; 415/4.4; 415/117; 416/140

(58) Field of Classification Search .......... 415/4.2, 415/4.4, 907, 117; 416/132 B, 140
See application file for complete search history.

(56) References Cited

U.S. PATENT DOCUMENTS

| 185,924 | A | * | 1/1877 | Howland et al. ............ 416/117 |
| 1,581,537 | A | * | 4/1926 | Hennigh ..................... 416/117 |
| 4,113,408 | A | | 9/1978 | Wurtz |
| 4,134,710 | A | | 1/1979 | Atherton |
| 5,083,902 | A | | 1/1992 | Rhodes |
| 5,195,871 | A | | 3/1993 | Hsech-Pen |
| 7,284,949 | B2 | * | 10/2007 | Haworth ..................... 415/4.2 |
| 2003/0161729 | A1 | | 8/2003 | Lindhorn |
| 2005/0196279 | A1 | | 9/2005 | Hartman |
| 2008/0181777 | A1 | | 7/2008 | Bailey |
| 2008/0304965 | A1 | * | 12/2008 | Syrovy ....................... 416/117 |
| 2009/0001730 | A1 | | 1/2009 | Kuo |

FOREIGN PATENT DOCUMENTS

| DE | 4123750 | 1/1993 |
| DE | 4322592 | 12/2004 |
| FR | 2538040 | 6/1984 |
| GB | 2119025 | 11/1983 |
| WO | WO0233253 | 4/2002 |
| WO | WO03014565 | 2/2003 |
| WO | WO2007034018 | 3/2007 |

* cited by examiner

Primary Examiner — Edward Look
Assistant Examiner — Dwayne J White
(74) Attorney, Agent, or Firm — Michael A. Blake

(57) ABSTRACT

A vertical axis wind turbine comprising: a rotatable vertical shaft; a first horizontal shaft attached to the vertical shaft, and extending on either side of the vertical shaft; a first wind turbine blade fixedly attached to the first horizontal shaft, the first wind turbine extending in a generally perpendicular direction from the first horizontal shaft; a second wind turbine blade fixedly attached to the first horizontal shaft, the second wind turbine blade extending in a generally perpendicular direction from the first horizontal shaft, the second wind turbine blade fixed at an operational angle with respect to the first wind turbine blade; a first and second motion limiting means attached to the vertical shaft, where each motion limiting means extends into the rotational travel of a turbine blade.

10 Claims, 7 Drawing Sheets

VERTICAL AXIS WIND TURBINE

CROSS-REFERENCES

The present application claims the benefit of provisional patent application No. 61/200,745 filed on Dec. 4, 2008 by Donald Bobowick, the entire contents of which are fully incorporated by reference herein.

TECHNICAL FIELD

The present invention relates to a vertical axis wind turbine, and in particular to a vertical axis wind turbine that employs aerodynamic and gravitational forces to tilt or swivel the angle of the wind turbine blades.

BACKGROUND

Due to the increasing consumption of fossil fuel, reserves of fossil fuel are gradually getting depleted and increasing levels of carbon dioxide are causing a severe "greenhouse" phenomenon in the Earth's atmosphere. Thus, the United Nations has issued regulations and commands and is coordinating the fight against global warming. Recently, all nations around the world have put a lot of effort into developing renewable energies, among which wind energy is one of the best. This is simply because wind power stations do not generate any carbon dioxide emissions and have absolutely no risk of nuclear pollution.

Electrical power is considered "advanced" energy and has an extremely wide range of applications. Electricity is also the foundation of modern civilization, and is a must for modern society.

A large problem with many currently known vertical axis wind turbines is that fifty percent of their rotation occurs when the turbine blades are facing and thus moving against the wind, thus causing a great inefficiency in power generation.

Therefore, a vertical axis turbine is desired which overcomes the above and other disadvantages.

SUMMARY

The disclosed invention relates to a vertical axis wind turbine comprising: a rotatable vertical shaft; a first horizontal shaft rotatably attached to the vertical shaft, and extending on either side of the vertical shaft, the first horizontal shaft having a first side on one side of the vertical shaft, and having a second side on an opposite side of the vertical shaft; a first wind turbine blade fixedly attached to the first horizontal shaft on the first side, the first wind turbine blade extending in a generally perpendicular direction from the first horizontal shaft; a second wind turbine blade fixedly attached to the first horizontal shaft on the second side, the second wind turbine blade extending in a generally perpendicular direction from the first horizontal shaft, the second wind turbine blade fixed at the operational angle with respect to the first wind turbine blade; a first motion limiting means attached to the vertical shaft, and adjacent to the first side of the of the first horizontal shaft, where the first motion limiting means extends into the rotational travel of the first turbine blade; and a second motion limiting means attached to the vertical shaft, and adjacent to the second side of the first horizontal shaft, where the first motion limiting means extends into the rotational travel of the second turbine blade.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
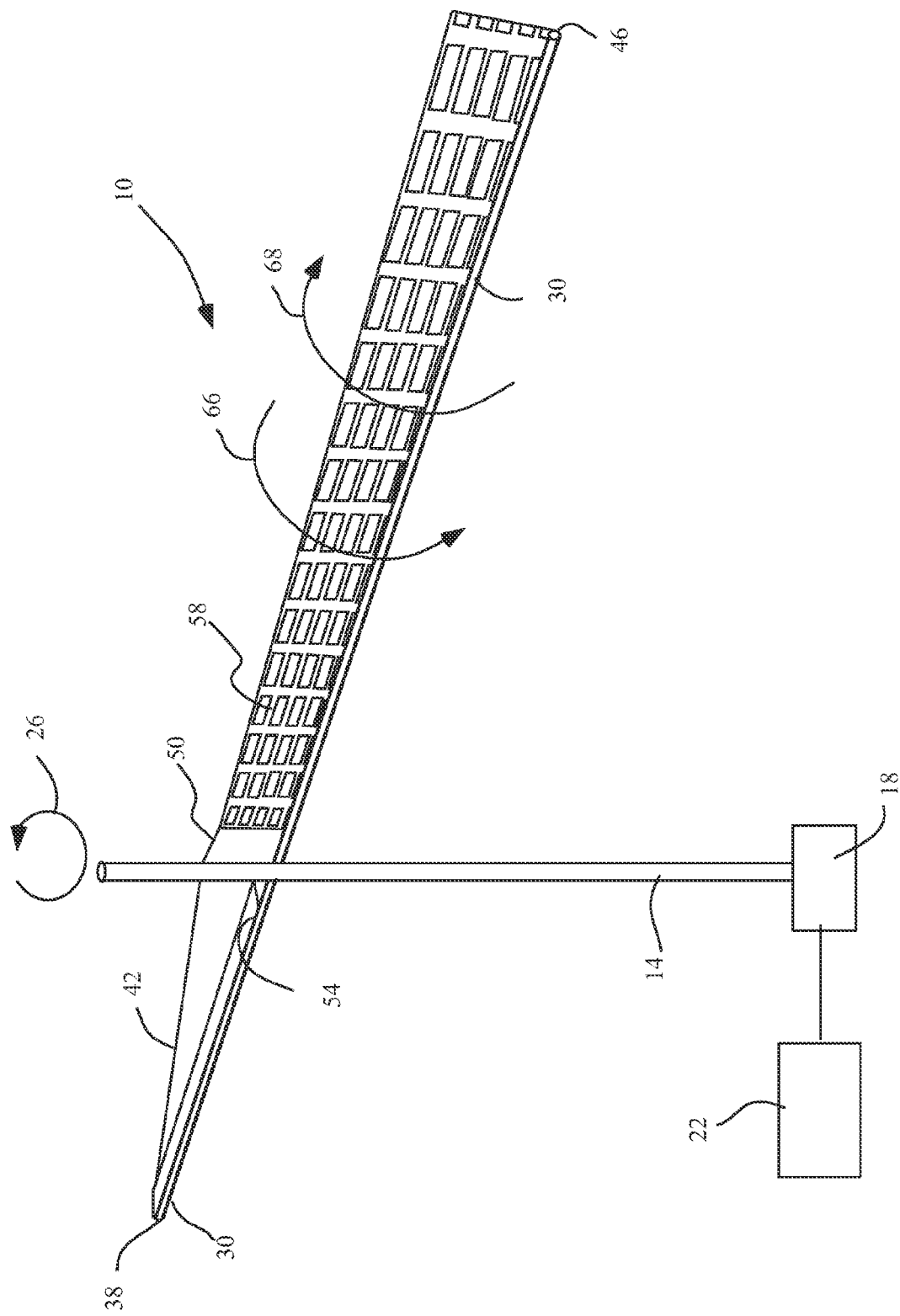
FIG. 1 is a perspective view of a first embodiment of the disclosed vertical axis wind turbine.

FIG. 1 is a perspective view of the disclosed vertical axis wind turbine 10. The vertical axis wind turbine comprises a rotatable central generally vertical shaft 14. The vertical shaft 14 may be in operational communication with a gearing system 18 which in turn is in operational communication with a power generator 22 or other driven equipment, such as but not limited to a pump, compressor, fan, blower, etc. One of ordinary skill in the art will recognize that the disclosed invention includes embodiments where the vertical shaft 14 is in direct communication via a coupling with power generator 22 or other driven equipment. The vertical shaft can rotate generally in the direction shown by the arrow 26. Although the arrow shows a rotation in a counter-clockwise direction when one looks down on the vertical shaft, the invention can be configured so that the vertical shaft 14 rotates in a clockwise direction, when looking down on the vertical shaft 14. In rotatable communication with the vertical shaft 14 is at least one horizontal shaft 30. The horizontal shaft 30 extends on two sides of the vertical shaft 14. The horizontal shaft 30 can rotate in generally either direction shown by the arrows 66 and 68. Extending generally orthogonally from the horizontal shaft is a first turbine blade 54 and a second turbine blade 58. The blades 54, 58 are on opposite sides of the vertical shaft 14. The first turbine blade 54 is at an operational angle with respect to the second turbine blade 58 as shown in FIG. 1. It should be noted that the disclosed invention will function, although less efficiently, with the operational angles ranging from about 46° to about 134°. Because the first turbine blade 54 and the second turbine blade 58 are fixed to the rotatable horizontal shaft 30, the blades 54, 58 remain perpendicular to each other, irrespective of the rotation of the horizontal shaft 30 with respect to the vertical shaft 14, in other words, the first turbine blade 54 and the second turbine blade 58 maintain a fixed angular orientation with respect to one an other. Attached to the vertical shaft 14 and at or near a first far end 38 of the horizontal shaft 30 is a first motion limiter 42. Attached to the vertical shaft 14 and at or near a second far end 46 of the horizontal shaft 30 is a second motion limiter 50. The motion limiters 42, 50 may be wire, line, cable, rod, or any other suitable means with a relatively low wind resistance that is able to stop the full rotation of the turbine blades 54, 58 and the horizontal shaft 30. The second motion limiter 50 is partially obstructed from view due to the second turbine blade 58. The second motion limiter 50 is currently impinging on the second turbine blade 58, preventing that second turbine blade 58, and the horizontal shaft 30, and the first turbine blade 54 from rotating in the direction 68. Similarly, when the horizontal shaft 30, rotates in the direction 66, the first motion limiter 42 will prevent continued rotation in the direction 66 when the first turbine blade 54 impinges on the first motion limiter 42.

Figure 2:
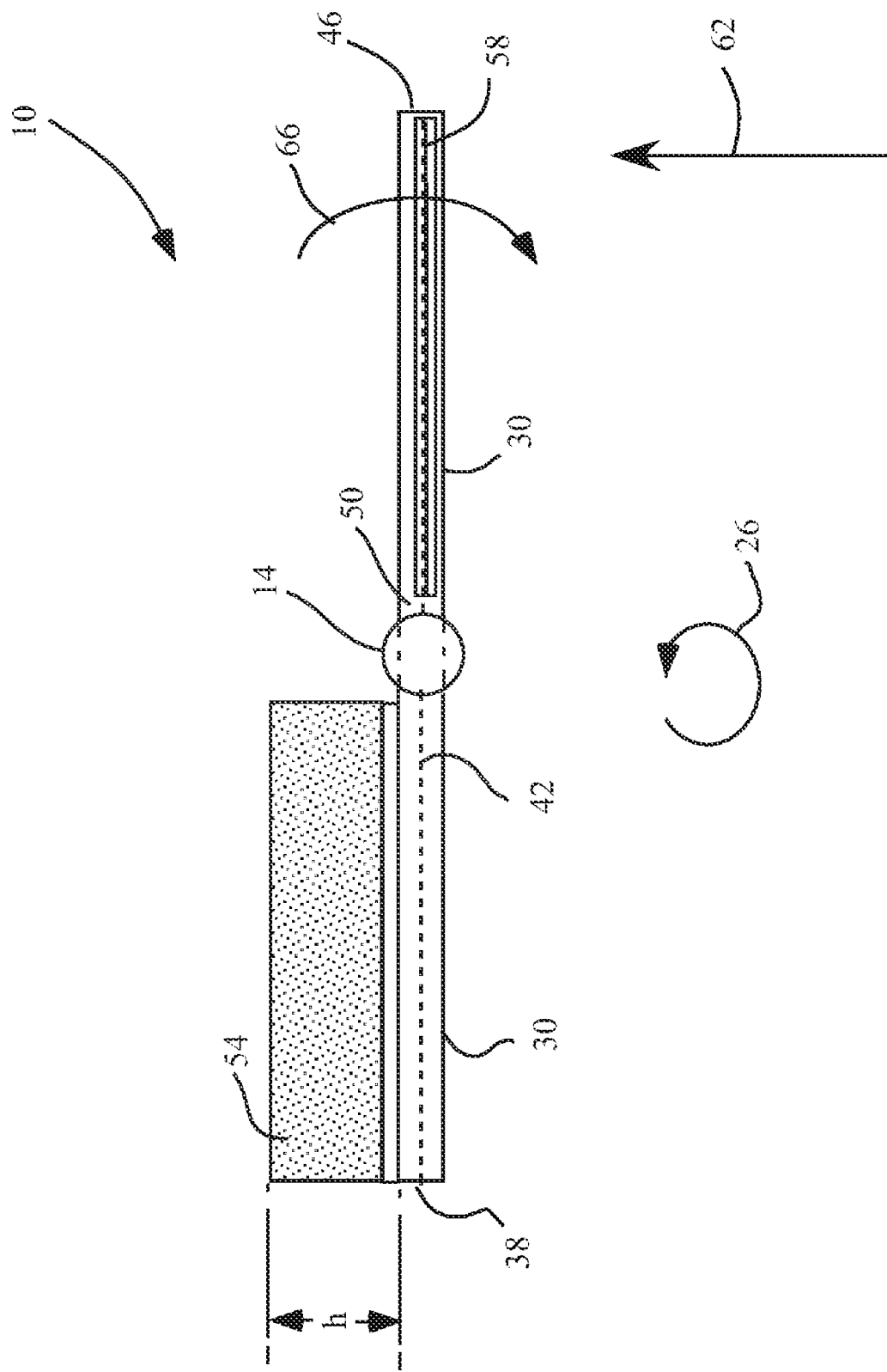
FIG. 2 is a top view of the disclosed vertical axis wind turbine from FIG. 1.

FIG. 2 shows a top view of the disclosed vertical axis wind turbine 10 in an instant of time. In this view the second turbine blade 58 is vertical, and appears generally as a line, conversely the first turbine blade is horizontal 54, and the full height "h" of the first turbine blade 54 is visible in this view. An arrow 62 represents the direction of the wind. In this moment of time, represented by FIG. 2, the wind is pushing the second turbine blade 58, while the second turbine blade's greatest surface area is perpendicular to the wind direction, causing the vertical shaft 14 to turn in the direction 26, thus allowing the vertical shaft 14 to transfer useful work to a driven machine and/or generator. The first turbine blade 54 is horizontal with respect to the wind, that is, a minimum amount of the first turbine blade's 54 surface area faces the wind direction, and thus the first turbine blade 54 generally does not reduce the amount of work that is extractable from the wind 62. It should be noted that the second turbine blade 58, in FIG. 2, is in an upright position, that is, the blade extends up away from the earth with respect to the horizontal shaft 30.

Figure 3:
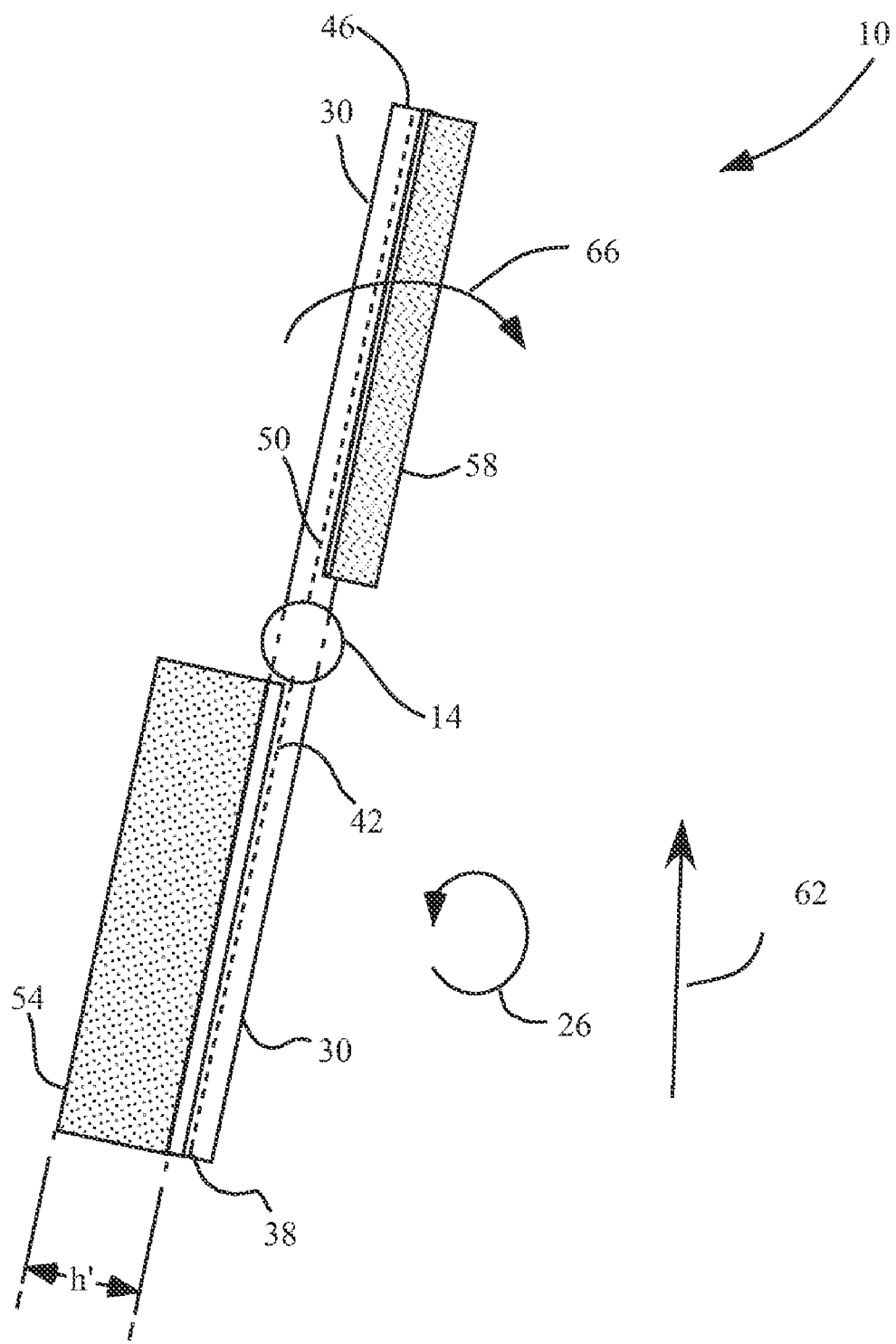
FIG. 3 is a top view of the disclosed vertical axis wind turbine at a later point in time from FIG. 2.

FIG. 3 shows a top view the disclosed vertical axis wind turbine 10 from FIG. 2, but this is slightly later in time, where the vertical shaft 14 has rotated about 60° in the direction of the arrow 26. The amount that the vertical shaft 14 has rotated in FIGS. 2-5 is for illustrative purposes, and may be more or less than the amounts stated. In FIG. 3, the horizontal shaft 30 has rotated with respect to the vertical shaft 14, such that the second turbine blade 58 has also rotated (the same angular amount as the horizontal shaft 30 has rotated with respect to the vertical shaft 14) with respect to the vertical shaft 14. The second turbine blade 58 is no longer is generally vertical, but has rotated down an angular amount in the general direction of the arrow 66. In FIG. 3, the second turbine blade 58 no longer appears in this top view as a line, but rather the surface area of the second turbine blade 58 can be seen. Similarly, the first turbine blade has rotated up (the same angular amount as the horizontal shaft 30 has rotated with respect to the vertical shaft 14) in the direction of the arrow 66, such that the height h' (referred to as h' instead of h due to the perspective foreshortening effect) of the first turbine blade appears shortened due to the perspective effective (i.e. the first turbine blade is no longer generally horizontal with respect to the vertical shaft 14). This rotation of the horizontal shaft 30 may be begin when the wind, shown by the arrow 62, lifts up the first turbine blade 54 from its horizontal orientation in the direction 66, and the effect of the wind, shown by the arrow 62, is lessened on the second turbine blade 58 due to the angle of the blade 58 with respect to the wind direction 62.

Figure 4:
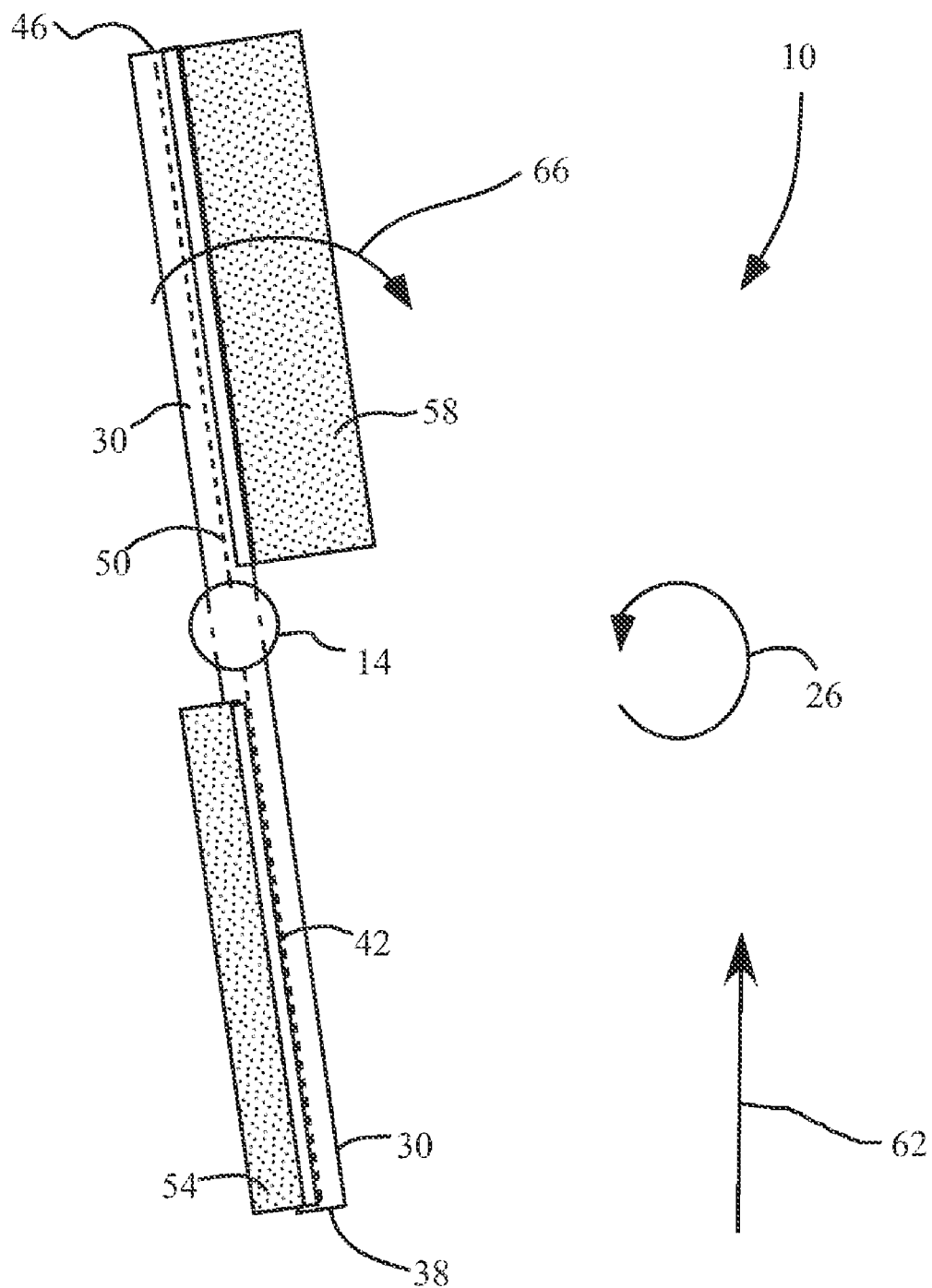
FIG. 4 is a top view of the disclosed vertical axis wind turbine at a later point in time from FIG. 3.

FIG. 4 shows a top view the disclosed vertical axis wind turbine 10 from FIG. 3, but at a slightly later time, where the vertical shaft 14 has rotated about another 15° in the direction of the arrow 26, with respect to FIG. 3. In this figure, the horizontal shaft 30, and the first and second turbine blades 54, 58 have rotated with respect to the vertical shaft generally in the direction of the arrow 66. Thus the second wind turbine blade 58 is getting closer to a horizontal position, and the first wind turbine blade 54 is beginning to approach a vertical position.

Figure 5:
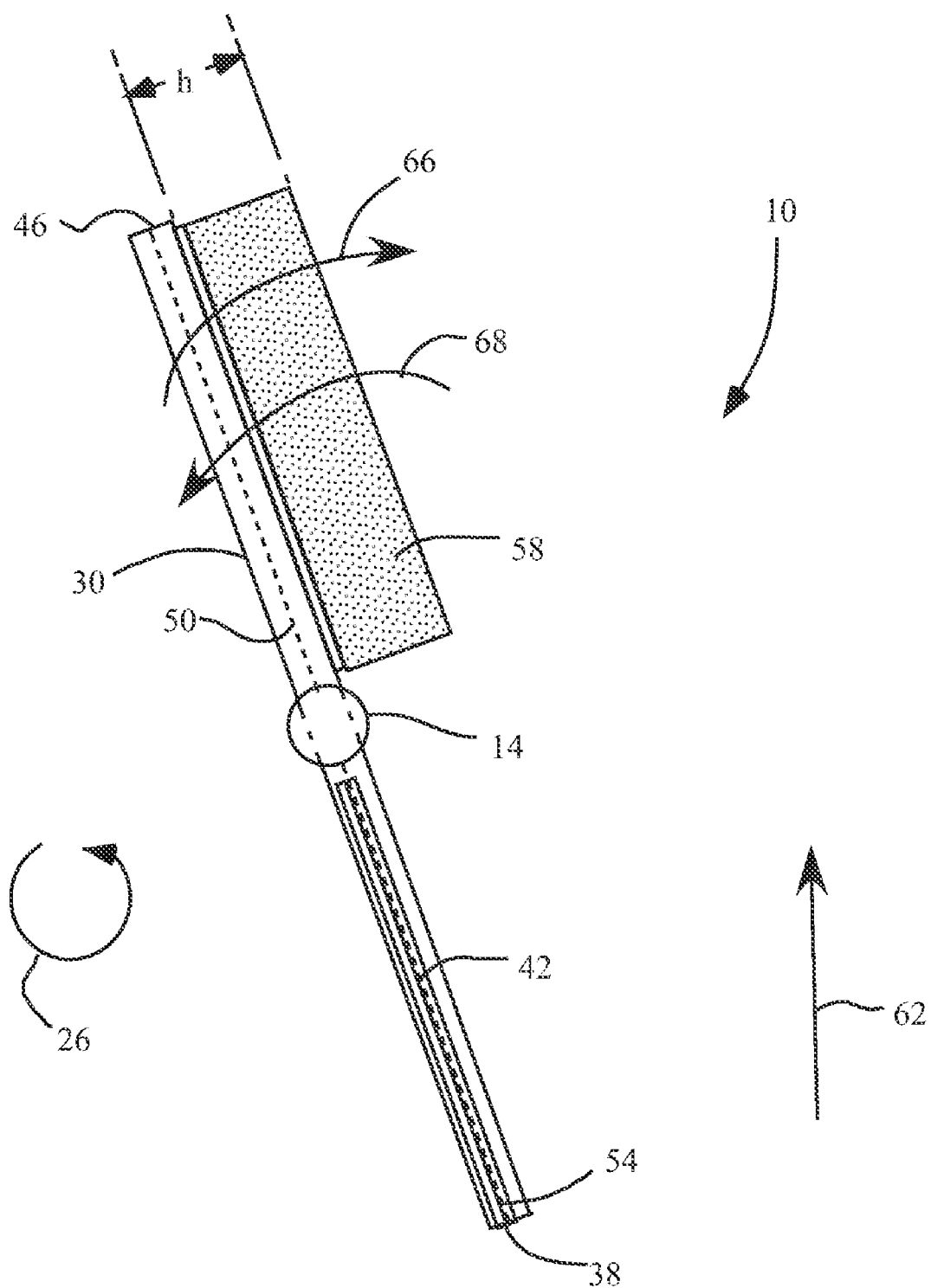
FIG. 5 is a top view of the disclosed vertical axis wind turbine at a later point in time from FIG. 4.

FIG. 5 shows a top view the disclosed vertical axis wind turbine 10 from FIG. 4, but at a slightly later time, where the vertical shaft 14 has rotated about another 5° to 10° in the direction of the arrow 26, with respect to FIG. 4. In this figure, the horizontal shaft 30, and the first and second turbine blades 54, 58 have rotated with respect to the vertical shaft generally in the direction of the arrow 66. At this point in time, the second wind turbine blade 58 is at a generally horizontal position, and the first wind turbine blade 54 is at generally a vertical position, and thus appears as a solid line. It should be noted that the first wind turbine blade 54, in FIG. 5, is in an upright position, that is, the blade extends up away from the earth with respect to the horizontal shaft 30. In this Figure, the height of the second turbine blade 58 is shown as h (not h'), because there is no perspective shortening of the blade height, since the second turbine blade 58 is horizontal. The first motion limiter 42 stops any further rotation in the direction 66, due to the first motion limiter 42 blocking continued rotation in that direction by the first turbine blade 42. Once the vertical shaft 14 rotates in the direction 26, such that the first turbine blade 54 is past being generally perpendicular to the wind direction 62, the horizontal shaft 30, and first and second turbine blades 54, 58 may begin to rotate in the direction 68. The cycle shown and described with respect to FIGS. 2 through 5 will generally repeat for every full rotation of the vertical shaft 14 in the direction 26. A person of ordinary skill in the art will recognize that additional horizontal shafts, each with its own first and second turbine blades fixedly attached to each of the horizontal shafts, may be rotatably attached to the vertical shaft 14. Further, each additional horizontal shaft may be attached so that each additional shaft is at a different fixed angle relative to a first horizontal shaft. That is, each horizontal shaft may be angularly staggered from each other horizontal shaft. This concept will be shown in FIGS. 6 and 7.

Figure 6:
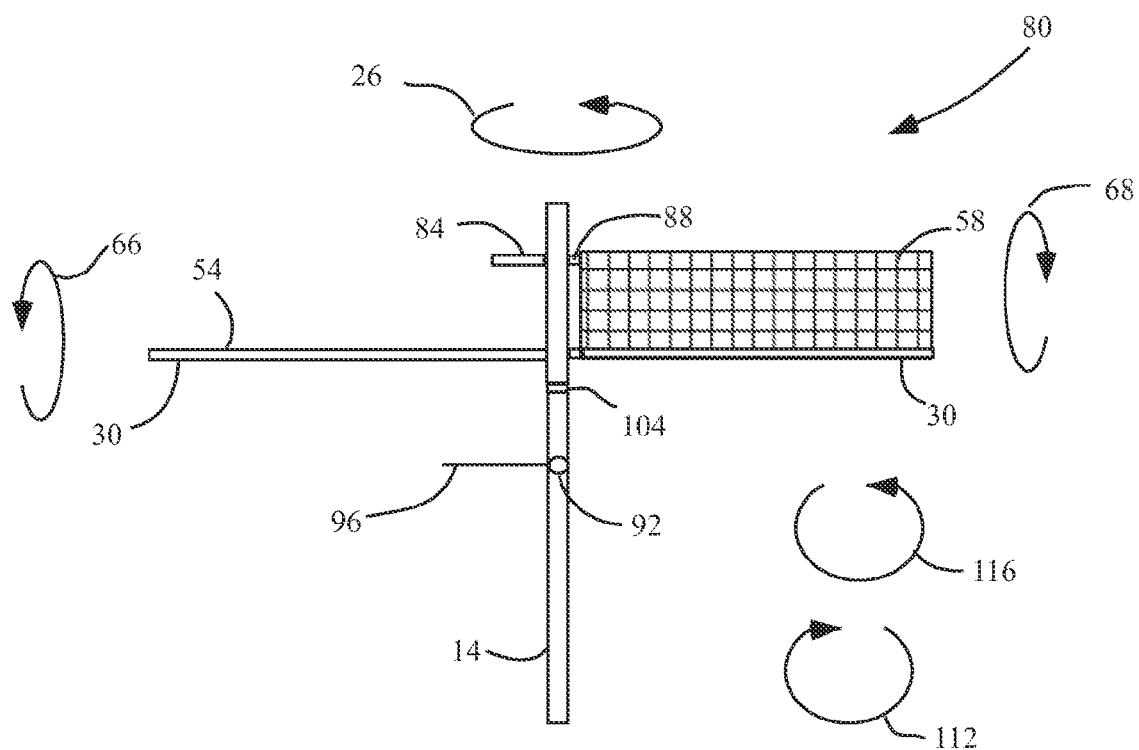
FIG. 6 is a side view of another embodiment of the disclosed vertical axis wind turbine.

FIG. 6 shows a side view of another embodiment 80 of the disclosed vertical axis wind turbine. In this embodiment, instead of using wire-type motion limiters, the first motion limiter 84 and second motion limiter 88 are fixed members attached to the vertical shaft 14. When the second turbine blade 58 impinges on the second motion limiter 88, the second turbine blade can no longer rotate back into the page (or in the direction 68). Similarly the first motion limiter 84 prevents the first turbine blade 54 from continuing to rotate in the direction 66 when the first turbine blade 54 impinges the first motion limiter 84. In this embodiment 80, a second horizontal shaft 92 is rotatably attached to the vertical shaft 14. The second horizontal shaft is, in this embodiment, about 90° staggered from the first horizontal shaft 30. A third turbine blade 96 is fixedly attached to the horizontal shaft 92 on one side of the vertical shaft 14, and a fourth turbine blade 100 is fixedly attached to the horizontal shaft 92 on the other side of the vertical shaft 14. The third turbine blade 96 is shown in a generally horizontal position, while the fourth turbine blade 100 is behind the vertical shaft, and is perpendicular to the third turbine blade 96, hence it is generally vertical, and pointing up, and is not visible behind the vertical shaft 14. A third motion limiter 104 extends from the vertical shaft 14. The fourth motion limiter 108 is on the other side of the vertical shaft and not visible.

Figure 7:
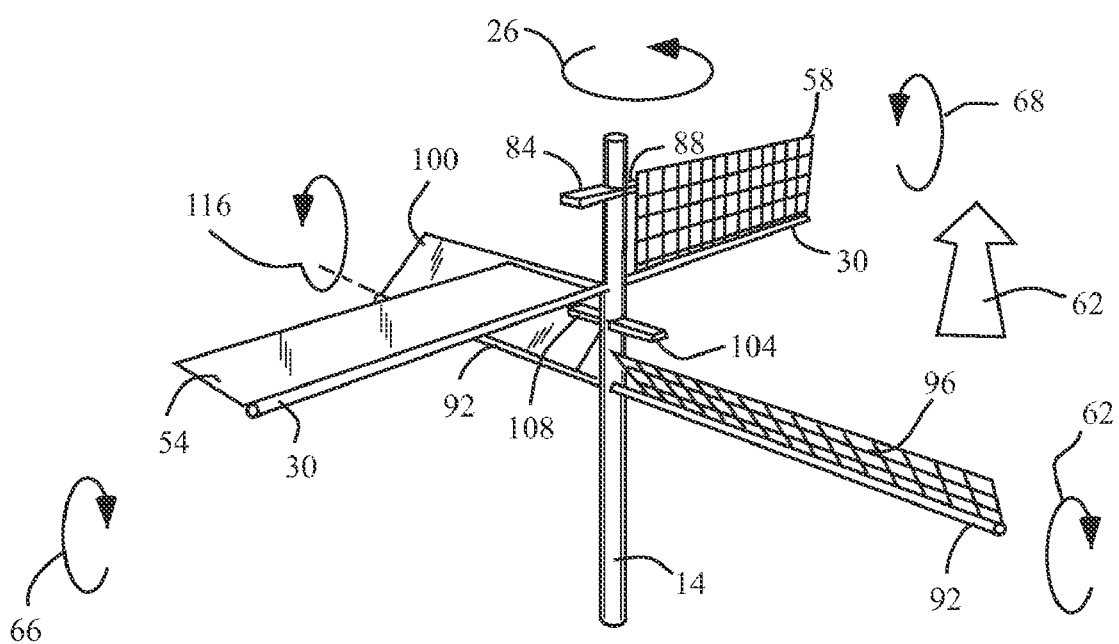
FIG. 7 is a perspective view of the disclosed vertical axis wind turbine from FIG. 6.

FIG. 7 is a perspective view of the embodiment shown in FIG. 6. The wind direction is represented by the arrow 62 and is meant to convey that the wind is blowing into the page. The first horizontal shaft 30 is 90° offset from the second horizontal shaft 92. The first turbine blade 54 is in a horizontal position, the second turbine blade 58 is in a vertical position, the first and second turbine blades 54, 58 are at an operational angle (which in one embodiment is an angle of about 90°) with respect to each other, and remain so due to their fixed attachment to the first horizontal shaft 30. The third turbine blade 96 is beginning to be lifted up by the wind, and by the downward gravitational force exerted on the fourth turbine blade 100, as well as any wind force acting on the fourth turbine blade 100. The third and fourth turbine blades are both fixedly attached to the horizontal shaft 92, which can rotate with respect to the vertical shaft 14 in the directions 112 and 116. The third and fourth turbine blades 96, 100 remain at an operational angle with respect to each other (in one embodiment the operational angle may be about 90°), and remain so due to their fixed attachment to the second horizontal shaft 92. In FIG. 6 and FIG. 7, it can be seen that the third motion limiter 104 stops the third turbine blade from rotating in the 112 direction, when the third turbine blade 96 impinges on the third motion limiter 104. Similarly, In FIG. 6 and FIG. 7, it can be seen that the fourth motion limiter 108 stops the fourth turbine blade 100 from rotating in the 116 direction, when the fourth turbine blade impinges on the fourth motion limiter 108. It should be noted that when one is looking down the first horizontal shaft 30, from the first turbine blade 54 to the second turbine blade 58, the direction 66 is rotation of the first horizontal shaft 30, and the first and second turbine blades 54, 58 in the clockwise direction, and the direction 68 is rotation of the first horizontal shaft 30, and the first and second turbine blades 54, 58 in the counter-clockwise direction. Similarly, when one is looking down the second horizontal shaft 92, from the third turbine blade 96 to the fourth turbine blade 100, the direction 112 is rotation of the second horizontal shaft 92, and the third and fourth turbine blades 96, 100 in the clockwise direction, and the direction 116 is rotation of the second horizontal shaft 92, and the third and fourth turbine blades 96, 100 in the counter-clockwise direction. Of course, one of ordinary skill in the art that this invention disclosure includes embodiments where the rotation directions of some or all of the rotating shafts and turbine blades may be in directions opposite to what has been shown in the embodiments of this paper. It has been found by the inventor that the disclosed wind turbine may have superior efficiency when turbine blades have a ratio of blade length to the blade height of about 4 to 1 through about 10 to 1. It should be noted that the diameter of the horizontal shaft should be sufficient to withstand the blade weight and wind pressure against the blades. The motion limiters should be as unobtrusive as possible while still functioning to limit the motion of the blades.

This invention has many advantages over the prior art. One advantage is that the wind turbine blades are generally in a vertical position when being blown by the wind and converting wind energy into useful work, and as the vertical shaft rotates, the wind turbine blades are generally horizontal when going against the wind, thus reducing losses due to the drag on the wind turbine blades. The disclosed invention works automatically, that is, no separate motors, or powered actuators are required to move the wind turbine blades from a vertical position to a horizontal position, and from a horizontal position to a vertical position. Rather, gravity and the force of the wind provide the required energy to rotate wind turbine blades. Being more energy efficient than prior art vertical wind turbines, the disclosed invention may be considered a "greener" energy source.

Other advantages include the fact that there is not a need for complex shaping of the turbine blades. Because disclosed invention is a 'drag' type wind turbine rather than a 'lift' type, the blades do not need to hold a specific aerodynamic shape. This allows a greater variety of lightweight blade materials and a reduced cost of manufacturing. The disclosed invention is highly scalable. The disclosed turbine invention's blades are balanced about the vertical shaft. The span of the blades can be without regard to the height of the wind turbine's supporting structure. Because of these 'balance and blade span' attributes the disclosed invention can scale up to larger more powerful size than the common horizontal axis wind turbine.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A vertical axis wind turbine comprising:
   a rotatable vertical shaft;
   a first horizontal shaft rotatably attached to the vertical shaft, and extending on either side of the vertical shaft, the first horizontal shaft having a first side on one side of the vertical shaft, and having a second side on an opposite side of the vertical shaft;
   a first wind turbine blade fixedly attached to the first horizontal shaft on the first side, the first wind turbine extending in a generally perpendicular direction from the first horizontal shaft;
   a second wind turbine blade fixedly attached to the first horizontal shaft on the second side, the second wind turbine blade extending in a generally perpendicular direction from the first horizontal shaft, the second wind turbine blade fixed at an operational angle with respect to the first wind turbine blade;
   a first motion limiting means attached to the vertical shaft, and adjacent to the first side of the of the first horizontal shaft, where the first motion limiting means extends into the rotational travel of the first turbine blade;
   a second motion limiting means attached to the vertical shaft, and adjacent to the second side of the first horizontal shaft, where the first motion limiting means extends into the rotational travel of the second turbine blade;
   a second horizontal shaft rotatably attached to the vertical shaft, and extending on either side of the vertical shaft, the second horizontal shaft having a first side on one side of the vertical shaft, and having a second side on an opposite side of the vertical shaft;
   a third wind turbine blade fixedly attached to the first horizontal shaft on the first side, the third wind turbine extending in a generally perpendicular direction from the second horizontal shaft;
   a fourth wind turbine blade fixedly attached to the second horizontal shaft on the second side, the fourth wind turbine blade extending in a generally perpendicular direction from the second horizontal shaft, the fourth wind turbine blade fixed at an operational angle with respect to the third wind turbine blade;
   a third motion limiting means attached to the vertical shaft, and adjacent to the first side of the of the second horizontal shaft, where the third motion limiting means extends into the rotational travel of the third turbine blade;

a fourth motion limiting means attached to the vertical shaft, and adjacent to the second side of the second horizontal shaft, where the fourth motion limiting means extends into the rotational travel of the fourth turbine blade;

a third horizontal shaft rotatably attached to the vertical shaft, and extending on either side of the vertical shaft, the third horizontal shaft having a first side on one side of the vertical shaft, and having a second side on an opposite side of the vertical shaft;

a fifth wind turbine blade fixedly attached to the third horizontal shaft on the first side, the fifth wind turbine blade extending in a generally perpendicular direction from the third horizontal shaft;

a sixth wind turbine blade fixedly attached to the third horizontal shaft on the second side, the sixth wind turbine blade extending in a generally perpendicular direction from the third horizontal shaft, the sixth wind turbine blade fixed at an operational angle with respect to the fifth wind turbine blade;

a fifth motion limiting means attached to the vertical shaft, and adjacent to the first side of the of the third horizontal shaft, where the fifth motion limiting means extends into the rotational travel of the fifth turbine blade; and a sixth motion limiting means attached to the vertical shaft, and adjacent to the second side of the third horizontal shaft, where the sixth motion limiting means extends into the rotational travel of the sixth turbine blade.

2. The vertical axis wind turbine of claim 1, wherein the operational angle is about 90°.

3. The vertical axis wind turbine of claim 1, wherein the operational angle is between about 46° and about 134°.

4. The vertical axis wind turbine of claim 1, further comprising:
a driven piece of machinery in operable communication with the vertical shaft, the driven piece of machinery selected from the group consisting of a power generator, a pump, a compressor, a fan, and a blower.

5. The vertical axis wind turbine of claim 4, further comprising:
a gear box in operable communication between the vertical shaft and the driven piece of machinery.

6. The vertical axis wind turbine of claim 1, wherein the second horizontal shaft is at an angle of between 0° and 90° with respect to the first horizontal shaft.

7. The vertical axis wind turbine of claim 6, wherein the third horizontal shaft is at an angle of between 0° and 90° with respect to the second horizontal shaft.

8. The vertical axis wind turbine of claim 1,
wherein the first motion limiting means comprises:
a cable attached to the vertical shaft adjacent to the first side of the first horizontal shaft, and attached to a far end of the first side of the horizontal shaft;
wherein the second motion limiting means comprises:
a cable attached to the vertical shaft adjacent to the second side of the first horizontal shaft, and attached to a far end of the second side of the horizontal shaft.

9. The vertical axis wind turbine of claim 1,
wherein the first motion limiting means comprises:
a member fixedly attached to and extending perpendicularly from the vertical shaft; and
wherein the second motion limiting means comprises:
a member fixedly attached to and extending perpendicularly from the vertical shaft.

10. The vertical axis wind turbine of claim 1,
wherein the first wind turbine blade is rotatable from a generally upright position, such that it is extending up away from the earth with respect to the first horizontal shaft, to a generally horizontal position, and wherein the first wind turbine blade is also rotatable from a generally horizontal position to a generally upright position; and
wherein the second wind turbine blade is rotatable from a generally upright position, such that it is extending up away from the earth with respect to the first horizontal shaft, to a generally horizontal position, and wherein the second wind turbine blade is also rotatable from a generally horizontal position to a generally upright position.

* * * * *